Patented Feb. 23, 1954

2,670,369

UNITED STATES PATENT OFFICE 2,670,369

PHOSPHONAMIC ACIDS

Pierre Filatoff-Rocq, San Francisco, and Richard D. Stayner, Albany, Calif., assignors to California Research Corporation, San Francisco, Calif., a corporation of Delaware No Drawing. Application September 29, 1950,
Serial No. 187,678

6 Claims. (Cl. 260—461)

This invention relates to the preparation of new organo-substituted acids of phosphorus, hereinafter designated as phosphonamic acids.

The term "phosphonamic acid" as used in this specification designates a phosphonic acid wherein the hydrocarbon substituent on the phosphorus atom is attached thereto by an aliphatic linkage and is an alkyl radical, and wherein one of the hydroxyl groups has been replaced by an amino group. Its general formula, therefore, may be written as

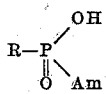

wherein Am is an amino group, and R is an alkyl radical.

In the following specification and claims, the group symbolized in the above general formula for phosphonamic acids by "Am" designates the amino group-containing residue of a compound from the group of ammonia, primary and secondary amines, primary and secondary alkylol amines, and heterocyclic nitrogen-bearing compounds in which two valence bonds of the nitrogen atom form a part of a heterocyclic ring as illustrated, e. g., by piperidyl and morpholyl radicals.

Among these aforementioned phosphonamic acids, those in which the hydrocarbon substituent directly linked to the phosphorus atom is an alkyl radical containing from 10 to 24 carbon atoms, represent the preferred group of acids of our invention.

It is the primary object of the present invention to provide new phosphonamic acids containing an alkyl radical directly attached to the phosphorus atom.

A more particular object of the invention is to provide phosphonamic acids, wherein the hydrocarbon substituent is an alkyl radical containing from 10 to 24 carbon atoms.

Other objects of this invention will appear hereinafter.

The procedure for preparing phosphonamic acids of our invention, whether containing an alkyl radical directly attached to the phosphorus atom, will be readily understood from the following description of the preparation of a typical phosphonamic acid, namely, one in which an alkyl group containing from 10 to 24 carbon atoms is linked to the phosphorus atom. One mol of phosphonyl dichloride, prepared by the method described by Jensen and Clayton in their application Serial No. 86,856, filed in the United States Patent Office on April 11, 1949, now abandoned, and in their substitute application thereto Serial No. 202,396, filed December 22, 1950, and containing an alkyl chain of 10 to 24 carbon atoms directly linked to the phosphorus atom is, reacted with one mol of a primary or a secondary amine, a primary or a secondary alkylol amine, a guanidine, or an organic heterocyclic nitrogen-bearing compound wherein two valence bonds of the nitrogen atom are linked to carbon atoms forming a part of the heterocyclic ring and the third bond is filled by a hydrogen atom, as illustrated by piperidine or morpholine. The phosphonyl dichloride is employed dissolved in an inert solvent, and the reactant containing the amino nitrogen atom is introduced into the solution of phosphonyl dichloride at a temperature from about 10° to about 30° C. Since hydrochloric acid is formed in the reaction, an equivalent amount of an inorganic or an organic acceptor for hydrochloric acid must be present during the reaction to take up all of this acid. Such an acceptor may be, e. g., an organic base such as pyridine, or an aqueous solution of NaHCO₃. The reaction is carried out with cooling in order to maintain the reaction at the desired temperature. After the addition of the amino compound to the phosphonyl dichloride, the mixture is heated on a steam bath for about 15 minutes to insure completion of reaction. The resulting chlorophosphonamide intermediate is then subjected to hydrolysis and yields the corresponding phosphonamic acid.

Suitable acceptors for the hydrochloric acid forming in course of reaction are provided, for instance, by sodium bicarbonate, sodium carbonate, lime, tertiary amines (e. g. pyridine), aqueous sodium hydroxide and, in general, by all those acceptors which will not hydrolyze the phosphonyl dichloride under the reaction conditions. Organic solvents for the phosphonyl dichloride must be inert under the conditions of reaction and are exemplified by acetone, carbon tetrachloride, chloroform, and the like.

The phosphonamic acids of our invention obtained by the aforedescribed method vary in physical appearance from colorless crystalline solids to tan-colored liquids.

The following examples are illustrative of the preparation of phosphonamic acids in accordance with our invention:

*Example I*

12.2 parts of monoethanol amine are added to a solution of 29.7 parts of dodecane phosphonyl dichloride in 40 parts of acetone at about room temperature maintained by cooling the reaction flask in an ice bath; thereupon 170 parts of an aqueous 5% solution of sodium bicarbonate are slowly added to the mixture which is then heated for 10 minutes to complete the reaction and cooled. Upon acidifying the reaction mixture with hydrochloric acid the product is extracted with ether, and the ether solution dried. After evaporation of the solvent, a tan-colored viscous liquid, identified as N-β-hydroxyethyl dodecane phosphonamic acid

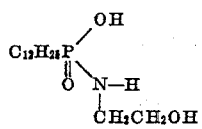

and having a neutralization number of 190, is obtained.

Example II

In this example, 6.1 parts of monoethanol amine and 8 parts of pyridine are added to a solution of 37.2 parts of octadecane phosphonyl dichloride at about room temperature and the reaction completed in accordance with the aforedescribed general procedure. Upon hydrolysis of the intermediate chlorophosphonamide N-β-hydroxyethyl octadecane phosphonamic acid is recovered as a viscous tan-colored liquid.

The phosphonamic acids of our invention and, in particular, the phosphonamic acids with alkyl chains containing from 10 to 24 carbon atoms in the hydrocarbon substituents linked to the phosphorus atom, constitute an important source of chemical intermediates suitable for conversion into a great variety of esters and salts (phosphonamates) which can be utilized in the manufacture of miscellaneous pharmaceuticals and other valuable industrial compositions.

The esters may be obtained by reacting the intermediate chlorophosphonamides of our invention with suitable alcohols. These esters vary in appearance from liquids to solids. For instance, an ethyl ester of the dodecane phosphonamic acid of the above illustrative example is easily prepared by substituting a mixture of 4.6 parts of ethanol and 7.9 parts of pyridine in lieu of the aqueous sodium bicarbonate solution in the preparation of dodecane phosphonamic acid.

With alkylene oxides, e. g. ethylene oxides, phosphonamic acids readily form polyglycol esters.

By reacting the phosphonamic acids with monovalent and divalent inorganic bases such as sodium hydroxide, potassium hydroxide, sodium bicarbonate, sodium carbonate, lime, and the like, corresponding alkaline metal and alkaline earth metal salts are produced, while on reacting phosphonamic acids with monovalent and divalent organic bases such as primary and secondary amines, alkylol amines (e. g., ethanolamine), tertiary amines (e. g., pyridine), and the like, corresponding organic base salts of phosphonamic acids are obtained.

In a typical illustration of the preparation of a phosphonamate in accordance with our invention, an equivalent amount of an aqueous solution of sodium bicarbonate, reacted with the dodecane phosphonamic acid of Example I hereinbefore, yields upon evaporation of the reaction mixture, crystals of sodium N-β-hydroxyethyl dodecane phosphonamate.

In concluding we wish it to be understood that the foregoing description of our invention is offered merely by way of illustration, and that a number of variations thereof may be made without departing from the scope of the invention, except as set forth in the following claims.

We claim:

1. As new products, organo-substituted compounds of phosphorus, corresponding to the formula

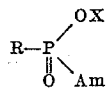

wherein R is an alkyl radical containing from 10 to 24 carbon atoms directly attached to the phosphorus atom; Am is an amino substituent selected from the group consisting of the radicals of primary and secondary alkylol amines; and X is selected from the group consisting of hydrogen, alkyl, alkali metal and alkaline earth metal radicals.

2. N-β-hydroxyethyl dodecane phosphonamic acid.

3. N-β-hydroxyethyl octadecane phosphonamic acid.

4. Ethyl ester of N-β-hydroxyethyl dodecane phosphonamic acids.

5. Sodium salt of N-β-hydroxyethyl dodecane phosphonamic acids.

6. A process for preparing phosphonamic acids, which comprises reacting in a mol ratio of 1:1 a phosphonyl dichloride having directly attached to the phosphorus atom an alkyl radical containing from 10 to 24 carbon atoms with an organic compound containing one amino nitrogen atom and selected from the group consisting of primary and secondary alkylol amines, in the presence of an acceptor for hydrochloric acid in an amount equivalent to the hydrochloric acid formed in said reaction; hydrolyzing the resulting chlorophosphonamide reaction product; and recovering the resulting phosphonamic acid.

PIERRE FILATOFF-ROCQ.
RICHARD D. STAYNER.

References Cited in the file of this patent

UNITED STATES PATENTS

| Number | Name | Date |
|---|---|---|
| 2,137,792 | Woodstock | Nov. 22, 1938 |
| 2,200,543 | Dickey et al. | May 14, 1940 |
| 2,382,309 | Hamilton | Aug. 14, 1945 |

OTHER REFERENCES

Kosolapoff, "Organic Phosphorus Compounds" (1950), pp. 284, 297, 316 and 317.